Patented Oct. 21, 1941

2,259,490

UNITED STATES PATENT OFFICE 2,259,490

ADHESIVE COMPOSITION

John E. Robinson, Glen Ellyn, Ill., assignor to American Can Company, New York, N. Y., a corporation of New Jersey No Drawing. Application July 10, 1937, Serial No. 153,053

3 Claims. (Cl. 260—27)

The present invention relates to a special adhesive which is adaptable for use with fibrous materials or other substances to provide tight seams or joints which will not pull loose or open up when subsequently subjected to ordinary temperatures or to reasonable handling, and the invention has particular reference to thermoplastic cement or adhesive made up of resins properly mixed together and without the use of solvents.

Vinyl and other resins have been used in adhesives in connection with suitable solvents. A prolonged drying time is required to dry off the solvents. Where the adhesive is used on fibrous material it is necessary to subject the fibre or paper to the heat of drying. This drying is injurious to the paper because the time and temperature required materially reduce the moisture content of the paper, making it lifeless. Such drying also distorts the paper out of shape and this presents problems of proper handling. There is also consequent waste of materials.

There is another serious difficulty in the use of solvent adhesive where the paper stock containing the adhesive is involved in the manufacture of containers for food products. Under commercial drying conditions for fibrous stock there is always the danger of some solvent being trapped and not properly eliminated. The result is a more or less vital danger of off-taste and odors as imparted by any slight traces of improperly dispensed solvent.

High speed production, the modern essential of manufacture, accentuates the problems. In the interest of time saving higher drying heats are employed and the difficulties are multiplied many times.

The present invention contemplates the production of a thermo-plastic adhesive without the use of solvents of any kind and includes the mixing together of resinous ingredients at elevated temperatures as by a kneading action. Such an adhesive when used on fibrous material does not require any destructive drying out or elimination of moisture from the fibrous stock and having no solvents the problem of imparted off-taste or odors is not present.

An object of the invention is the provision of a method of preparing a special thermo-plastic adhesive for use on fibrous materials to hold the fibrous parts in close bonded relation and to create a joint which will not be disturbed by subsequent heating at reasonable temperatures as for example 200° F. or less.

Another object is the provision of a method of joining fibrous surfaces in a secured joint by the use of a mixture of polymerized vinyl acetate and dammar gum which when fully set is not disturbed by subsequent handling or by ordinary temperatures.

Yet another object is the provision of steps for a method of manufacturing fibrous containers for food stuff and the like in which a thermoplastic adhesive is used which will not impart an off-taste or an odor to the product packed in the finally completed container.

Numerous other objects and advantages of the invention will be apparent as it is better understood from the following description which is of a preferred embodiment thereof.

The thermo-plastic adhesive of the present invention has been commercially used in the manufacture of fibre containers such as shown, for example, in the J. M. Hothersall Patent Number 2,085,979, issued by the United States Patent Office on July 6, 1937, and such a use will be hereinafter referred to as it provides an excellent example for showing many of the advantages inherent in the thermo-plastic adhesive of the invention.

In the Hothersall container the body is formed into tubular shape and the edges of the fibre blank from which the body is made are brought together in lapped relation. A sealed joint is made of these lapped parts by squeezing them together with the thermo-plastic adhesive interposed between the laps. At the time of sealing the adhesive is in heated or plastic condition and while tacky, the overlapped edges are firmly pressed together. This may be done by suitable die parts, rollers or the like which may be heated or cooled as required in order to produce the desired bond of the fibre sections. The ends of the Hothersall container are similarly secured to the body.

After this forming of the adhesive joints the container is liquid proofed by immersion in melted paraffin which may be maintained at as high a temperature as 190° F. The seams are in direct contact with the hot liquid and are subject to the high temperatures, some times for an appreciable length of time. The thermoplastic adhesive of the present invention withstands such drastic action and the joints made therewith are still tight and are unaffected. This example of one use of the present adhesive presents a concrete picture which it is believed will show some of the problems which are solved by this special adhesive.

The thermo-plastic of the present invention in a preferred form consists of polymerized vinyl acetate which is a synthetic resin, and dammar gum which is a natural resin. The polymerized vinyl acetate preferably comes in granular form. the dammar resin may be used in its natural state but is preferably somewhat refined being also in granular form.

In making up the thermo-plastic adhesive some consideration must be had to the use for which the adhesive will be subsequently directed. In providing a thermo-plastic adhesive suitable for the manufacture of the Hothersall container previously referred to by way of example, 30 parts of dammar gum and 70 parts of polymerized vinyl acetate are found to provide an excellent seam holding adhesive.

These materials are put into a mixing mill where they are held at temperatures varying from 250° F. to 350° F. while being completely kneaded and thoroughly mixed for substantially fifty or sixty minutes. The resulting mixture is kept hot being in a viscous, fluid state. As such it is in satisfactory condition to be applied to the fibrous surface. For applying to the surface to be stuck together the adhesive is preferably introduced into a tank or suitable vessel which is maintained at a temperature of from 350° F. to 450° F. Application to the surface of fibrous stock for example may be made by passing the stock over adhesive applying rollers which may be located in the tank and which rotate in the heated liquid.

The adhesive when applied as a thin film on the fibrous surface will set or harden substantially immediately. Artificial cooling may be used if desired. Such cooling would be used where only very short drying time is available as in high speed production but the adhesive film being thin will of itself be quick setting.

Continuing with the example of manufacture of the Hothersall can, the edges of the blank to which this adhesive has been applied will next be brought together. This may be between heated surfaces or the adhesive may be softened by heat and the joint made under a pressure exerted in suitable manner as by dies or rollers. This forms the seal or tight joint desired and the pressure members can then be immediately backed off or removed from the body.

Other materials may be added to the resinous ingredients entering into the thermo-plastic cement if desired but such additions will not be in the nature of solvents. Different quantities of gums may also be used other than the proportions given. Satisfactory adhesives for fibre containers for example may be made where the percentage of polymerized vinyl acetate ranges between 60 and 75 with the corresponding percentages for the dammar gum ranging between 40 and 25 percent.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A composition of matter suitable for application to a fibrous surface at a temperature of at least 300° F. consisting of a mixture of approximately 70 parts of polymerized vinyl acetate and approximately 30 parts of dammar resin which will not lose its adhesive qualities when subjected to high temperatures.

2. A composition of matter suitable for application as an adhesive at a temperature of from 350 degrees F. to 450 degrees F. to secure the joints of a container constructed of fibrous material, said composition consisting of a mixture of from 60 to 75 parts of vinyl acetate and from 40 to 25 parts of dammar gum, whereby to insure retention of the adhesive characteristics of said composition when the container is subjected to a temperature of substantially 190 degrees, as for example when passed through a bath of molten paraffin to render the container liquid proof.

3. A process of preparing a thermo-plastic adhesive designed to permanently seal the joints of containers constructed of fibrous material which will not give way when subjected to immersion in molten paraffin at a temperature of substantially 190 degrees F., consisting in thoroughly mixing from 60 to 75 percent polymerized vinyl acetate with from 40 to 25 percent dammar resin while maintaining the mixture at a temperature of from 250 degrees F. to 350 degrees F., whereby said mixture is suitable for subsequent application to the said container joints at a temperature of from 350 degrees F. to 450 degrees F.

JOHN E. ROBINSON.